(12) United States Patent
Sirin et al.

(10) Patent No.: US 10,996,413 B2
(45) Date of Patent: May 4, 2021

(54) FIRE RESISTANT OPTICAL FIBRE CABLE WITH HIGH FIBRE COUNT

(71) Applicant: Prysmian S.p.A., Milan (IT)

(72) Inventors: Zekeriya Sirin, Bursa (TR); Baris Sönmez, Bursa (TR); Can Altingoz, Bursa (TR)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/823,497

(22) Filed: Mar. 19, 2020

(65) Prior Publication Data
US 2020/0310059 A1 Oct. 1, 2020

(30) Foreign Application Priority Data

Mar. 26, 2019 (IT) .................. 102019000004367

(51) Int. Cl.
*G02B 6/44* (2006.01)
*C09K 21/06* (2006.01)

(52) U.S. Cl.
CPC ......... *G02B 6/4436* (2013.01); *G02B 6/4434* (2013.01); *G02B 6/4488* (2013.01); *C09K 21/06* (2013.01); *G02B 6/4432* (2013.01)

(58) Field of Classification Search
CPC .. G02B 6/4436; G02B 6/4434; G02B 6/4488; G02B 6/4432
See application file for complete search history.

(56) References Cited

U.S. PATENT DOCUMENTS

| | | | |
|---|---|---|---|
| 6,049,647 A * | 4/2000 | Register | G02B 6/4416 385/100 |
| 6,122,424 A * | 9/2000 | Bringuier | G02B 6/4494 385/100 |

(Continued)

FOREIGN PATENT DOCUMENTS

| | | |
|---|---|---|
| GB | 2138168 A | 10/1984 |
| WO | 2007049090 A1 | 5/2007 |
| WO | 2019-01-032019001715 A1 | 1/2019 |

OTHER PUBLICATIONS

Caledonian Cables Ltd.; FIREFLIX Fire Resistant Fiber Optic Cables product catalog; retrieved from http://www.caledonian-cables.co.uk/DdFls/Fire%20Resistant%20Cable/fire%20resistant%20fiber%20cables.pdf; page last modified May 19, 2016; 4 pages, including pp. 35-36.

(Continued)

*Primary Examiner* — Ryan A Lepisto
(74) *Attorney, Agent, or Firm* — Ulmer & Berne LLP

(57) ABSTRACT

A fire-resistant optical fibre cable includes a core having a central strength member and buffer tubes arranged around the central strength member. Each buffer tube contains optical fibres. A mica layer is arranged around the core. A glass yarn layer surrounds and is in direct contact with the mica layer. Metal armour surrounds the glass yarn layer. A multi-layered sheath surrounds and is in direct contact with the armour. The sheath includes a first layer, a second layer surrounding and in contact with the first layer, and a third layer in a radial inner position with respect to the first layer and in direct contact thereto. The first, second and third layers are made of LS0H flame-retardant material. The LS0H material of the first layer has an LOI higher than the LOI of the LS0H material of the second and third layers. The second layer is the cable outermost layer.

14 Claims, 1 Drawing Sheet

(56) References Cited

U.S. PATENT DOCUMENTS

| | | | |
|---|---|---|---|
| 6,330,385 B1* | 12/2001 | Sheu | G02B 6/4436 |
| | | | 385/109 |
| 8,422,844 B2* | 4/2013 | Tsukamoto | G02B 1/048 |
| | | | 385/128 |
| 9,459,423 B2* | 10/2016 | Gallo | G02B 6/4436 |
| 10,527,808 B2* | 1/2020 | Sahoo | G02B 6/4432 |
| 10,534,149 B2* | 1/2020 | Baetz | G02B 6/4496 |
| 2015/0131952 A1 | 5/2015 | Gallo et al. | |
| 2016/0266342 A1 | 9/2016 | Ellis et al. | |
| 2017/0365378 A1* | 12/2017 | Kaga | H01B 7/292 |
| 2019/0101715 A1* | 4/2019 | Hudson, II | G02B 6/4434 |
| 2020/0126690 A1* | 4/2020 | Sirin | H01B 7/295 |
| 2020/0271881 A1* | 8/2020 | Sirin | G02B 6/4434 |
| 2020/0341221 A1* | 10/2020 | Sirin | G02B 6/4432 |

OTHER PUBLICATIONS

Caledonian Technology Ltd; Fire resistant Multi Loose Tube Fiber Optic cables product information; Jan. 12, 2017, XP002781692; retrieved from URL https://web.archive.org/web/20170112105032/http://caledonian-cables.com/product/Fire-Resisting-Cable/Multi-Loose-Tube.html; 6 pages.

Cohen, Adam; Search Report issued in Italian Patent Application No. 201900004367; completed on Nov. 12, 2019; 2 pages.

* cited by examiner

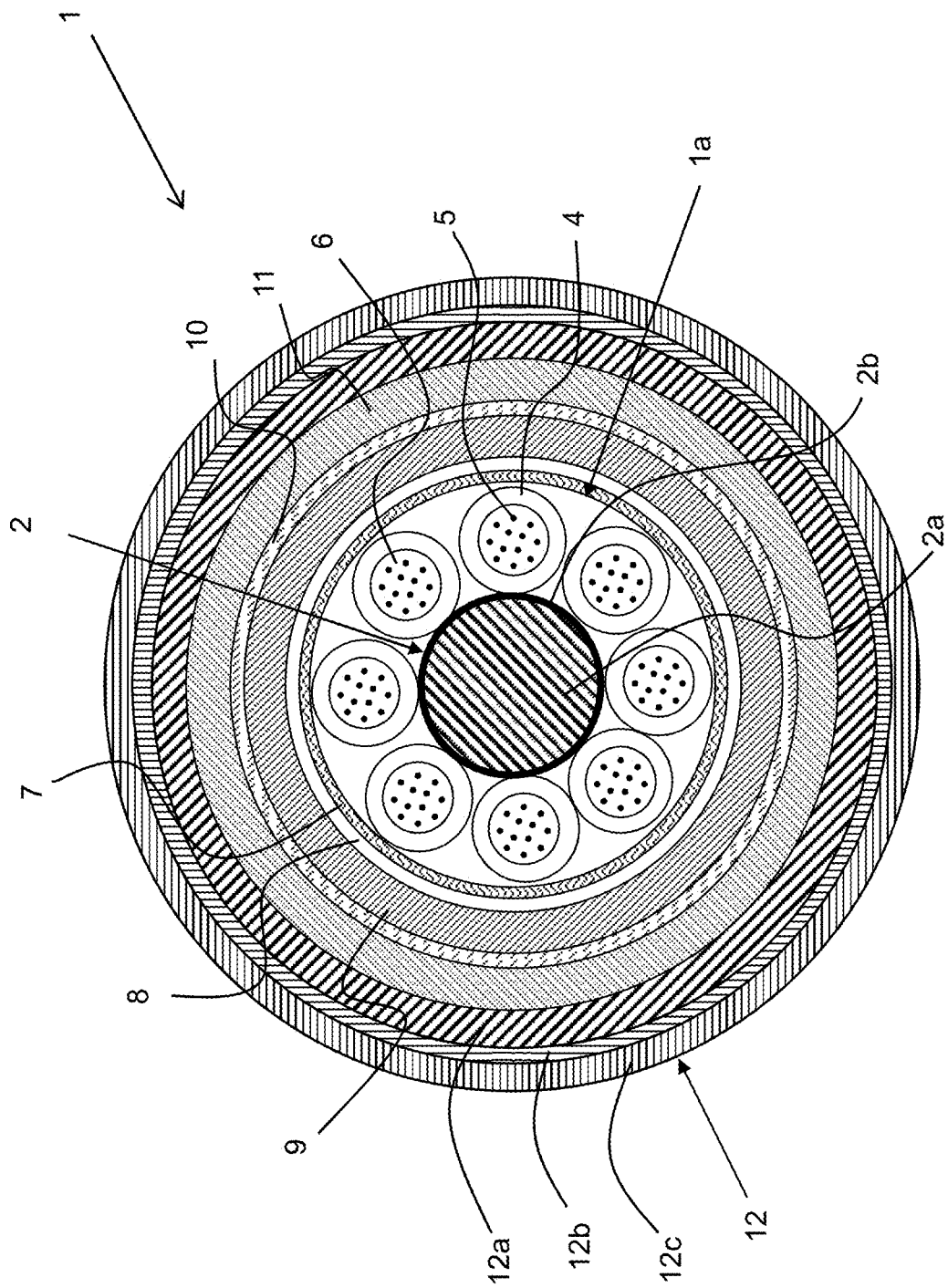

FIRE RESISTANT OPTICAL FIBRE CABLE WITH HIGH FIBRE COUNT

FIELD OF APPLICATION

The present disclosure relates to the field of optical cables suitable for operating during a fire and thereafter.

In particular, the present disclosure relates to a fire-resistant optical fibre cable having a high fibre count and extended fire resistivity up to 180 minutes.

PRIOR ART

Optical fibre cables are generally used for telecommunications also on long distance, offering irrefutable advantages over traditional wire-based telecommunication networks in terms of capability of transmission of more information at significantly higher speeds.

In certain applications, optical cables should be able to withstand fire without significantly decreasing of their transmission performance. For instance, cables used in fire alarm systems and/or local video surveillance should be able to continue to transmit data/signals in the presence of fire.

Optical fibre cables can be required to maintain their performances not only during fire but also for a predetermined period of time after the fire is extinguished.

The above requirements are more challenging to meet for optical fibre cables with a high fibre count—which are increasingly requested by the market—as the increase of the number of fibres in the cable results in a reduction of the empty spaces among fibres. While fire barriers can provide a suitable protection against heat during fire, the reduction of empty spaces among fibres can cause fibre break after fire, during the cooling time, because of the shrinkage of the polymeric buffer tubes housing the optical fibres.

In addition, the international standards and customer's demands become more and more stringent about the fire performance properties of the optical fibre cables for improving fire safety in buildings and lasting of the cable resistance under fire.

Thus, there is a need for optical fibre cables, especially for optical cables with high fibre count to improve the fire resistance and duration of the cable both during fire and after a predetermined period of time after fire (cooling time) so as to improve security.

GB 2 138 168 discloses a fire resistant fibre cable comprising an optical fibre. The cable can comprise an inner core of fibre reinforced plastics, around which the optical fibres are placed. Around each of the optical fibres there is provided a jacket of organic material, and the spaces between the fibre and the jacket are filled up with silicone grease. Around each jacket of organic material there is wound a layer of mica tape, preferably arranged on a glass carrier. Around one or a group of organic jackets with fire retardant covers there is provided a layer of glass tape. Outside the glass tape there is provided a filler jacket having good fire retardant properties. Outside said filler jacket there may be an armour, braiding, covering or wiring of glass, steel or other fire-proof material.

US 2015/0131952 discloses a fire resistant optical communication cable. The cable comprises a plurality of core elements including bundles of optical fibers located within tubes arranged around a central strength member formed from glass-reinforced plastic. A layer located outside of and surrounding the elements of core may be a fire retardant tape such as mica tape. An armor layer may be located outside of the fire retardant layer. A plurality of particles of an intumescent material is embedded within the material of cable jacket.

FIREFLIX catalogue of Caledonian Cables Ltd (2016, page 35-36) discloses, inter alia, fire resistant armoured fibre optic cables comprising from 5 to 36 fibre containing tubes, stranded around a central strength member. The central strength member can be made of glass fibre reinforced plastics. Each tube contains from 4 to 12 fibres and is filled with a water-blocking gel. The tubes are individually wound with fire blocking mica glass tape. The jelly filled tube is water-blocked by using swellable tape and thread. The cable is jacketed with an inner sheath in thermoplastic material LSZH, around which a steel armour and an outer LSZH sheath are provided.

The Applicant has faced the problem of providing an optical fibre cable with high fibre count having improved fire resistance properties allowing it to maintain its performance for a longer period of time during fire and also for a predetermined period of time after the fire is extinguished so as to meet the aforementioned need.

SUMMARY

The Applicant found that in an optical cable with a high fibre count an extended fire protection and a reduction of fibre breakage after fire can be attained when the cable is provided with mica tape(s) and glass yarn layer collectively surrounding all the buffer tubes housing the optical fibers and with a flame-retardant multi-layered sheath comprising layers of LS0H flame retardant material having limiting oxygen index (LOI) different one from the other, and the outermost layer thereof has a low LOI.

In particular, Applicant has experienced that the provision of a flame retardant outer multi-layered sheath as indicated above in combination with mica tape(s) and glass yarn layer form allows to protect the underling optical fibres against fire for a prolonged period of time and also for a certain period of time after the fire is extinguished during cooling, thereby reducing damages to the optical fibres after fire.

The above benefits are achieved without impairing the mechanical properties of the optical cable, particularly in terms of tensile strength and elongation at break, even after thermal ageing, and workability of the sheath, for example through conventional extrusion techniques.

Accordingly, the present disclosure relates to a fire-resistant optical fibre cable comprising:
- a core comprising a central strength member, and a plurality of buffer tubes arranged around the central strength member, each buffer tube containing a plurality of optical fibres;
- a mica layer arranged around the core;
- a glass yarn layer surrounding and in direct contact with the mica layer;
- a metal armour surrounding the glass yarn layer; and
- a multi-layered sheath surrounding and in direct contact with the metal armour,
- wherein the multi-layered sheath comprises a first layer, a second layer surrounding and in contact with the first layer, and a third layer in a radial inner position with respect to the first layer and in direct contact thereto, the first, second and third layers being made of a LS0H flame-retardant material, the LS0H material of the first layer having a limiting oxygen index (LOI) higher than the LOI of the LS0H material of the second layer and of third layer, and the second layer is the cable outermost layer.

The third layer of the multi-layered sheath surrounds and is in direct contact with the metal armour.

According to an embodiment, the first layer of the multi-layered sheath is made of a LS0H flame-retardant material having a LOI higher than 70%.

According to an embodiment, the third layer and the second layer of the sheath are both made of a LS0H flame-retardant material having a LOI from 25% to 70%, for example from 30% to 50%.

DETAILED DESCRIPTION

Within the present description and the subsequent claims, the limiting oxygen index (LOI) is the minimum concentration of oxygen, expressed as percentage, that supports combustion of a polymer in case of fire. Higher values of LOI indicate greater fire retardancy. LOI values are determined by standardized tests, such as ASTM D2863-12 (2012) or CEI 20-22-4 (2006 July).

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

As used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It should be understood that the features of the embodiments of the disclosure disclosed above and below can be combined in any way, even forming further embodiments that are not explicitly disclosed but that fall within the scope of the present disclosure.

For the purpose of the present description and claims, an optical fibre comprises a transmissive core surrounded by a cladding, said core and cladding being preferably made of glass, and one or two protecting coatings based, for example, on acrylate material.

In an embodiment, the optical fibre cable of the present disclosure comprises at least twenty-four (24) optical fibres. The optical fibre cable can contain up to 144 optical fibres.

The number of buffer tubes in the cable and the number of optical fibres contained in each buffer tube may vary according to cable specification or customer request. For example, each buffer tube may contain from 2 to 12 optical fibres.

In an embodiment, the core of the present cable further comprises binding yarns surrounding the buffer tubes (to keep them in place while applying the mica layer during manufacturing), and/or water swellable tape, for example in form of a longitudinally foil, surrounding the buffer tubes for water tightness.

In an embodiment, the buffer tubes contain a water-blocking filling material comprising a silicone gel, wherein said silicone gel has a drop point of at least 200° C.

For the purpose of the present description and appended claims, drop point is a numerical value assigned to a grease composition representing the temperature at which the first drop of material falls from a test cup. Drop point can be measured under the conditions set forth in ASTM D566-02 (2002).

The Applicant experienced that damages to the optical fibre after fire can be further reduced by providing a silicone gel as water-blocking material inside the buffer tubes, said silicone gel having a drop point higher than 200° C.

Silicone is generally a very stable polymer, a great deal of this stability deriving from reversible hydrolysis reactions occurring under heating such that the polymer essentially heals itself. Applicant observed that a silicone gel surrounding the optical fibres during and after fire could provide some protection against mechanical stress.

In an embodiment, the silicone gel as water-blocking material is a polyorganosiloxane, for example dimethylsiloxane, dimethylmethylphenylsiloxane, methylphenylsiloxane.

In an embodiment, the silicone gel as water-blocking material has a drop point ≥250° C.

In some embodiments, the central strength member comprises a body of reinforced dielectric material. In an alternative embodiment, the central strength member comprises a body of metallic material, such as steel.

In an embodiment, the central strength member comprises a LS0H flame-retardant polymeric material. The LS0H flame-retardant polymeric material may be embedded in the reinforced dielectric material of the central strength member. Alternatively, the LS0H flame-retardant polymeric material of the central strength member may be in the form of a layer applied on the outer surface of the body of the central strength member.

In an embodiment, the LS0H flame-retardant polymeric material of the central strength member has a LOI of from 25% to 40%.

In the present description and claims, as "LS0H flame-retardant polymeric material" it is meant a polymeric material containing an inorganic flame-retardant filler selected from: metal hydroxides, hydrated metal oxides, metal salts having at least one hydroxyl group, and hydrated metal salts.

The Applicant found that a LS0H flame-retardant material in radially inner position with respect to the arrangement of buffer tubes which contain the optical fibres can enable a further reduction or even avoidance of said optical fibre breakage. Hydroxides like magnesium hydroxide and aluminium hydroxide are preferably used as flame retardant fillers because of their capability of releasing water when heated. Without wishing being bound to any theory, the Applicant conjectured that the hydroxide contained in a LS0H flame-retardant material in radial inner position with respect to the buffer tubes, though not directly reached by the flame, can anyway be subjected to a temperature triggering the release of an amount of water suitable for lowering the heat the buffer tubes. Accordingly, the buffer tube polymeric material can undergo a lower thermal expansion which the silicone gel water-blocking material, where provided, is able to fully compensate during cooling after fire with limited stress to the optical fibre.

In addition, the presence of LS0H flame-retardant material in radial inner position with respect to the buffer tubes allows using a single fire barrier surrounding all of the buffer tubes together, rather than other arrangements such as a fire barrier around each single tube, enabling a saving of material for the fire barrier and a manufacturing process simplification.

In an embodiment of the optical cable according to the disclosure, the buffer tubes contain a water-blocking filling material comprising a silicone gel, wherein said silicone gel has a drop point of at least 200° C. and the central strength member comprises a LS0H flame-retardant polymeric material.

In an embodiment, the LS0H flame-retardant polymeric material of the central strength member comprises a flame-retardant filler selected from aluminium or magnesium hydroxide, aluminium or magnesium hydrated oxide, aluminium or magnesium salt having at least one hydroxyl group or aluminium or magnesium hydrated salt.

In an embodiment, the LS0H flame-retardant polymeric material of the central strength member comprises magnesium hydroxide, alumina trihydrate or hydrated magnesium carbonate. In another embodiment, the hydroxide-containing flame-retardant polymeric material of the central strength member comprises magnesium hydroxide.

Magnesium hydroxide is characterized by a decomposition temperature of about 340° C. and thus allows high extrusion temperatures to be used. The magnesium hydroxide of the present disclosure can be of synthetic or natural origin, the latter being obtained by grinding minerals based on magnesium hydroxide, such as brucite or the like, as described, for example, in WO2007/049090.

The flame-retardant filler can be used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer material, the flame-retardant filler can likewise be surface-treated with suitable coupling agents, for example short chain organic silanes or titanates such as vinyltriethoxysilane, vinyltriacetylsilane, tetraisopropyl titanate, tetra-n-butyl titanate and the like.

In an embodiment, the LS0H flame retardant polymeric material of the central strength member comprises a polymer selected from: polyethylene; copolymers of ethylene with at least one α-olefin containing from 3 to 12 carbon atoms, and optionally with at least one diene containing from 4 to 20 carbon atoms; polypropylene; thermoplastic copolymers of propylene with ethylene and/or at least one α-olefin containing from 4 to 12 carbon atoms; copolymers of ethylene with at least one ester selected from alkyl acrylates, alkyl methacrylates and vinyl carboxylates, wherein the alkyl and the carboxylic groups comprised therein are linear or branched, and wherein the linear or branched alkyl group may contain from 1 to 8, preferably from 1 to 4, carbon atoms, while the linear or branched carboxylic group may contain from 2 to 8, preferably from 2 to 5carbon atoms; and mixtures thereof.

With "α-olefin" it is generally meant an olefin of formula $CH_2=CH-R$, wherein R is a linear or branched alkyl having from 1 to 10 carbon atoms. The α-olefin can be selected, for example, from propylene, 1-butene, 1-pentene, 4-methyl-1-pentene, 1-hexene, 1-octene, 1-dodecene and the like. Among them, propylene, 1-butene, 1-hexene and 1-octene are particularly preferred.

Examples of polymer that may be used in the flame retardant LS0H polymeric material for the central strength member of the present disclosure are: high-density polyethylene (HDPE) (d=0.940-0.970 g/cm$^3$), medium-density polyethylene (MDPE) (d=0.926-0.940 g/cm$^3$), low-density polyethylene (LDPE) (d=0.910-0.926 g/cm$^3$); linear low-density polyethylene (LLDPE) and very-low-density polyethylene (VLDPE) (d=0.860-0.910 g/cm$^3$); polypropylene (PP); thermoplastic copolymers of propylene with ethylene; ethylene/vinyl acetate (EVA) copolymers; ethylene/ethyl acrylate (EEA) copolymers, ethylene/butyl acrylate (EBA) copolymers; ethylene/α-olefin rubbers, in particular ethylene/propylene rubbers (EPR), ethylene/propylene/diene rubbers (EPDM); and mixtures thereof.

In an embodiment, the mica layer comprises one or two mica tapes. The mica tape/s is/are wound around the core comprising the central strength member and the buffer tubes. When two mica tapes are present, they can be wound in the same direction.

The mica layer and the glass yarn layer are reinforcing layer providing physical protection and tensile strength with added fire protection. The weight of those layers mainly depends on the required mechanical performance, particularly tensile strength, according to the specific application of the cable.

The metal armour of the cable of the disclosure can be made of any material suitable for providing the cable core with protection against external stress, in particular against compressive forces and to make the cable rodent-proof. In an embodiment, the armour is made of steel or copper which can be in form of metal wires or of a corrugated tape or of a longitudinally sealed tube, optionally applied around the cable core by a draw down technique.

In an embodiment, a fourth layer made of a flame retardant LS0H polymeric material is interposed between the glass yarn layer and the metal armour, and optionally in direct contact with one or both of them. The LS0H polymeric material of the fourth layer may have a LOI in the range as disclosed for the second and third layer of the multi-layered sheath. The fourth layer can be made of substantially the same material do the third and/or second layer.

The polymer material of the above fourth layer can be selected from the list already provided in connection with the LS0H flame-retardant material of the central strength member. The same applies for the inorganic-flame retardant filler contained therein.

In an embodiment, a water-swellable layer, made of one or more layers, is interposed between the glass yarn layer and the metal armour.

In an embodiment, a water-swellable layer surrounds the fourth layer made of a flame retardant LS0H polymeric material, optionally in direct contact with it. In an embodiment, the water-swellable layer comprises or consists of a tape including water-swellable material and longitudinally applied over the fourth layer. The water-swellable layer provides longitudinally water tightness to the cable, thereby preventing water and/or moisture from penetrating along the cable. For example, the water-swellable material can comprise super absorbent polymers (SAPS), such as SAP powder.

The cable according to the present disclosure includes a multi-layered sheath surrounding the metal armour and in direct contact with it. The multi-layered sheath comprises a third layer, a first layer and a second layer, all made of a LS0H flame-retardant material.

The polymer material of each layer of the multi-layered sheath can be selected from the list already provided in connection with the LS0H flame-retardant material of the central strength member. The same applies for the inorganic-flame retardant filler contained therein.

In an embodiment, the first layer of the multi-layered sheath is made of a LS0H flame-retardant material having a LOI higher than 70%, for example from 75% to 90%.

In an embodiment, the third layer and the second layer of the multi-layered sheath are both made of a LS0H flame-retardant material having a LOI lower than that of the first layer, comprised of from 25% to 70%. In an embodiment, the LOI of the third and of the second layer materials range from 30% to 50%.

In an embodiment, the third layer and the second layer of the multi-layered sheath are made of substantially the same LS0H flame-retardant material.

In an embodiment, the third layer is made of a LS0H flame-retardant material having a LOI lower than that of the second layer. The LOI of the third layer material can range from 25 to 35%, while the LOI of the second layer material can range from 35 to 50%. It is clear to the person skilled in the art that in this embodiment when the second layer material has a LOI of 35%, the third layer material will have a lower LOI within the range specified above.

A different LOI can be imparted to a LS0H flame retardant polymeric material by varying the amount of inorganic flame-retardant filler mixed to the polymer base which will be greater, for example, in the flame-retardant material forming the first layer of the sheath and lower in the material forming the second layer of the sheath.

In particular, according to an embodiment of the present disclosure, the amount of the flame-retardant filler in the LS0H material of the first layer of the multi-layered sheath is of at least 500 phr, preferably from 600 phr to 900 phr.

According to an embodiment of the present disclosure, the amount of the flame-retardant filler in the LS0H material of the second layer, third layer of the multi-layered sheath, of the fourth layer and or the central strength member is lower than 500 phr, preferably from 150 phr to 300 phr.

According to an embodiment of the present disclosure, the amount of the flame-retardant filler in the LS0H material of the second layer is of from 180 phr to 400 phr, and the amount of the flame-retardant filler in the LS0H material of the third layer is from 150 phr to 180 phr.

Within the present description and the claims, the term "phr" (acronym of "parts per hundred of rubbers") is used to indicate parts by weight per 100 parts by weight of the polymer base.

The layers of the multi-layered sheath are in direct contact with one another so that the third layer is surrounded and in direct contact with the first layer which, in turn, is surrounded and in direct contact with the second layer.

In the multi-layered sheath, each layer can have a thickness between 0.8 and 2.5 mm.

The production of the optical cable according to the disclosure can be carried out by conventional techniques. For example, the application of the reinforcing layers (mica layer and glass yarn layer) and of the metallic armour layer can be carried out through sheathing machines and the armour can also be thermally sealed along the overlapping. In addition, the multi-layered sheath can be applied to surround the metallic armour through conventional plastic material extrusion processes. For example, the multi-layered sheath can be applied by means of the "tandem" technique, in which separate extruders arranged in series are used for applying the third layer, the first layer and subsequently the second layer, or by co-extruding the third layer, the first layer and the second layer.

Further details will be illustrated in the following detailed description given by way of example and not of limitation, with reference to the attached FIG. 1 which is a cross-section of a fire-resistant optical fibre cable according an embodiment of the present disclosure.

In FIG. 1, the optical fibre cable is indicated by reference number 1. Cable 1 comprises a core 1a. The core 1a, in turn, comprises a central strength member 2 and a plurality of buffer tubes 4, each comprising a plurality of optical fibres 5.

The central strength member 2 is an elongated element and it can have a circular or substantially circular cross-section. In the present embodiment, the central strength member comprises a body 2a of reinforced dielectric material, for example glass reinforced plastic (GRP), fibre reinforced plastic (FRP) or any other similar material. The body 2a is covered by a coating 2b made of LS0H flame retardant LS0H polymeric material. The material of the coating 2b can contain e.g. magnesium hydroxide in an amount of about 130 phr. This material can have a LOI of 28%.

A number of buffer tubes 4 are arranged radially around the central strength member 2. In an embodiment, the buffer tubes 4 are stranded around the central strength member 2 in S-Z configuration.

In the embodiment of FIG. 1, eight buffer tubes 4 are provided around the central strength member 2. However, there could be more or less tubes in other embodiments.

The buffer tubes 4 can be made of any suitable polymeric material, for example polybutylene terephthalate (PBT). In an embodiment, the buffer tubes can be made of a LS0H flame retardant LS0H polymeric material, as described above.

Each buffer tube 4 contains a plurality of optical fibres. In an embodiment, each buffer tube 4 contains 12 optical fibres.

Each buffer tube 4 may contain water-blocking filling material 6 comprising a silicone gel with a drop point of at least 200° C.

For example, materials suitable as water-blocking filling for the cable of the present disclosure are polyorganosiloxane marketed as Rhodorsil® by Rhodia Siliconi Italia S.p.A., Italy.

It should be remarked that each single buffer tube 4 is not individually protected by fire resistant materials, for example mica tapes.

The core 1a comprising buffer tubes 4 and central strength member 2 is wrapped by a mica layer 7.

In an embodiment, the mica layer 7 comprises two mica tapes. Mica, for example in form of flakes, may be bonded to a backing layer using a binding agent, such as silicone resin or elastomer, acrylic resin and/or epoxy resin. The backing layer may be formed of a supporting fabric, such as woven glass and/or glass cloth.

In an embodiment, each mica tape is wound with an overlapping. The overlapping can be higher than 40% and preferably of 50%.

In radial external position and in direct contact with the mica layer 7 a layer of glass yarns 8 is provided.

The layer of glass yarns 8 and the mica layer 7 act as fire barrier. The fire barrier layer has mainly the function of avoiding direct contact of the core with the flames which surround the cable in case of fire.

In radial external position and in direct contact with the layer of glass yarns a fourth layer 9 is provided. The fourth layer 9 can be extruded directly on the layer of glass yarns 8.

The fourth layer 9 can have a thickness between 0.8 and 2.5 mm. In one embodiment, such thickness is of 1.4 mm.

The fourth layer 9 is made of a flame retardant LS0H polymer material. The material of the fourth layer 9 can contain e.g. magnesium hydroxide in an amount of about 200 phr. This material can have a LOI of 37%.

In radially outer position with respect to the fourth layer 9 a water-swellable layer 10 is provided having essentially the function of blocking the ingress and transport of water and/or moisture towards the inside of the cable.

In radially outer position with respect to the water-swellable layer 10 a metal armour 11 is provided.

In the present embodiment, armour 11 can be made of corrugated metal tape 11 made, at least partially, of steel, for example. Armour 11 can have a thickness of 0.15 mm.

In one embodiment, the metal armour has at least one surface coated with a copolymer layer. In another embodiment, the metal armour 11 has both the surfaces coated with a copolymer layer.

In a radially outer position to and in direct contact with the metal armour 11, a multi-layered sheath 12 is provided. The multi-layered 12 can be extruded directly on the armour 11.

The multi-layered sheath 12 comprises a third layer 12a, a first layer 12b and a second layer 12c, all made of a flame-retardant LS0H polymeric material, the LS0H material of the first layer having a limiting oxygen index (LOI) higher than the LOI of the LS0H material of the second and third layers.

For example, the material of the first layer 12b can contain e.g. magnesium hydroxide in an amount of about 780 phr. This material can have a LOI of 85%. The material of the third layer 12a and of the second layer 12c can each contain e.g. magnesium hydroxide in an amount of about 200 phr. This material can have a LOI of 37%.

EXAMPLE

The Applicant has conducted fire-resistance tests on cables according to the present disclosure having a structure analogous to that of cable 1 of FIG. 1 and containing 144 fibres in 12 buffer tubes, 12 fibres each.

The buffer tubes of the cables were made of polybutene (PBT) and filled with a polydimethylsiloxane gel having a drop point greater than 250° C. In addition, each cable had a central strength member made of GRP covered by a coating made of LS0H flame retardant LS0H polymeric material having a LOI of 28%.

The flame-retardant fourth layer was made of a flame retardant LS0H polymer-based material containing magnesium hydroxide and having a LOI of about 37%.

The multi-layered sheath was made of a flame retardant LS0H polymer-based material containing magnesium hydroxide and having a LOI of about 37% for the third layer and the second layer, and a LOI of 85% for the first layer.

Two standards were used for testing the above-mentioned cables: IEC 60331-25 (1999) and BS 7846-F2 (2015).

All the tested cables according to the present disclosure passed both the above-mentioned tests.

Regarding test IEC 60331-25 (1999), after 180 minutes at 750° C., a 1.5 dB signal attenuation was detected. After a cooling of 15 minutes, the optical fibres were found to be fully functioning (not broken, no disconnection of signal), thus proving the circuit integrity.

It should be noted that standard IEC 60331-5 (1999) normally advices fire resistance after 90 minutes of fire with 15 minutes of cooling period. However, the above tests show that the cables according to the disclosure maintain their performance for a longer period of time during fire and also during the cooling period, thereby assuring an improved (extended) fire protection and a reduction of fibre breakage after fire.

Regarding test BS 7846-F2 (2015), the cables according to the disclosure were tested to assess separately resistance to fire alone and resistance to fire with spray water. Resistance to fire alone was assessed at a test temperature of 950±40° C. and a flame duration of 15 minutes. Resistance to fire with spray water was assessed at a test temperature of 650±40° C. for 15 minutes under the flame and further 15 minutes under the flame plus water.

All the tested cables according to the disclosure passed the above test as the optical fibres were found to be fully functioning with no fibre breakage but only a signal attenuation.

The invention claimed is:

1. A fire-resistant optical fibre cable comprising:
a core comprising a central strength member, and a plurality of buffer tubes arranged around the central strength member, each buffer tube containing a plurality of optical fibres;
a mica layer arranged around the core;
a glass yarn layer surrounding and in direct contact with the mica layer;
a metal armour surrounding the glass yarn layer; and
a multi-layered sheath surrounding and in direct contact with the metal armour,
wherein the multi-layered sheath comprises a first layer, a second layer surrounding and in contact with the first layer, and a third layer in a radial inner position with respect to the first layer and in direct contact thereto, the first, second and third layers being made of a LS0H flame-retardant material, the LS0H material of the first layer having a limiting oxygen index (LOI) higher than the LOI of the LS0H material of the second layer and of third layer, and the second layer is the cable outermost layer.

2. The optical fibre cable according to claim 1, wherein the first layer of the is made of a LS0H flame-retardant material having a LOI higher than 70%.

3. The optical cable according claim 2, wherein the first layer is made of a LS0H flame-retardant material having a LOI from 75% to 90%.

4. The optical fibre cable according to claim 1, wherein third layer and the second layer of the multi-layered sheath are both made of a LS0H flame-retardant material having a LOI from 25% to 70%.

5. The optical fibre cable according to claim 4, wherein the third layer and the second layer are both made of a LS0H flame-retardant material having a LOI from 30% to 50%.

6. The optical fibre cable of claim 1 wherein the buffer tubes contain a water-blocking filling material comprising a silicone gel, wherein said silicone gel has a drop point of at least 200° C.

7. The optical fibre cable of claim 6 wherein the silicone gel has a drop point of 250° C.

8. The optical fibre cable of claim 1 wherein the central strength member comprises a LS0H flame-retardant polymeric material.

9. The optical fibre cable of claim 8 wherein the central strength member comprises a body having an outer surface and the LS0H flame-retardant polymeric material is in form of a layer on the outer surface of the body.

10. The optical fibre cable of claim 9 wherein the LS0H flame-retardant polymeric material of the central strength member has a limiting oxygen index of from 25% to 40%.

11. The optical fibre cable of claim 1 further comprising a fourth layer interposed between the glass yarn layer and the metal armour.

12. The optical fibre cable of claim 11 wherein the fourth layer is made of a flame retardant LS0H polymeric material having a limiting oxygen index (LOI)≥30%.

13. The optical fibre cable of claim 1 further comprising a water swellable layer interposed between the glass yarn layer and the metal armour.

14. The optical fibre cable of claim 1 wherein each layer of the multi-layered sheath has a thickness between 0.8 and 2.5 mm.

* * * * *

UNITED STATES PATENT AND TRADEMARK OFFICE
CERTIFICATE OF CORRECTION

PATENT NO. : 10,996,413 B2  
APPLICATION NO. : 16/823497  
DATED : May 4, 2021  
INVENTOR(S) : Zekeriya Sirin et al.

Page 1 of 1

It is certified that error appears in the above-identified patent and that said Letters Patent is hereby corrected as shown below:

In the Claims

Column 10, Claim 2, Line 34, change "of the is made" to --is made--;
Column 10, Claim 3, Line 36, change "according claim 2" to --according to claim 2--;
Column 10, Claim 4, Lines 39-40, change "wherein third layer" to --wherein the third layer--; and
Column 10, Claim 7, Line 51, change "drop point of 250° C" to --drop point of $\geq$ 250° C--.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*